US011956065B2

(12) United States Patent
Xu et al.

(10) Patent No.: US 11,956,065 B2
(45) Date of Patent: Apr. 9, 2024

(54) METHOD, DEVICE AND COMPUTER READABLE MEDIUM FOR SUPPORTING SATELLITE ACCESS

(71) Applicant: Nokia Technologies Oy, Espoo (FI)

(72) Inventors: Xiang Xu, Jiangsu (CN); Jeroen Wigard, Klarup (DK); Laurent Thiebaut, Antony (FR)

(73) Assignee: Nokia Technologies Oy, Espoo (FI)

( * ) Notice: Subject to any disclaimer, the term of this patent is extended or adjusted under 35 U.S.C. 154(b) by 514 days.

(21) Appl. No.: 17/275,414

(22) PCT Filed: Sep. 28, 2018

(86) PCT No.: PCT/CN2018/108477
§ 371 (c)(1),
(2) Date: Mar. 11, 2021

(87) PCT Pub. No.: WO2020/062092
PCT Pub. Date: Apr. 2, 2020

(65) Prior Publication Data
US 2022/0060250 A1    Feb. 24, 2022

(51) Int. Cl.
*H04B 7/185*    (2006.01)
(52) U.S. Cl.
CPC ..... *H04B 7/18513* (2013.01); *H04B 7/18519* (2013.01)
(58) Field of Classification Search
CPC ... H04W 4/02; H04W 48/20; H04W 74/0841; H04W 16/28; H04W 48/10; H04W 4/29
USPC .................................................. 455/433, 513
See application file for complete search history.

(56) References Cited

U.S. PATENT DOCUMENTS

| | | | |
|---|---|---|---|
| 6,539,200 B1 * | 3/2003 | Schiff ................ | H04B 7/18567 455/433 |
| 6,868,270 B2 | 3/2005 | Dent .......................... | 455/435.1 |
| 9,887,765 B1 | 2/2018 | Freedman et al. | |
| 10,516,971 B2 * | 12/2019 | Edge ..................... | H04W 4/029 |
| 2001/0004595 A1 | 6/2001 | Dent ............................. | 455/435 |

(Continued)

FOREIGN PATENT DOCUMENTS

| | | |
|---|---|---|
| CN | 1292177 A | 4/2001 |
| CN | 1299539 A | 6/2001 |

(Continued)

OTHER PUBLICATIONS

I. Koutsopoulos and L. Tassiulas, "Efficient resource utilization through carrier grouping for half-duplex communication in GSM-based MEO mobile satellite networks," in IEEE Transactions on Wireless Communications, vol. 1, No. 2, pp. 342-352, Apr. 2002, doi: 10.1109/7693.994828. (Year: 2002).*

*Primary Examiner* — William D Cumming
(74) *Attorney, Agent, or Firm* — Barta Jones, PLLC (57) ABSTRACT

A method, device and computer readable medium are used to support satellite access. The registration management entity of the network determines information regarding which beam covering the location of the terminal device and the corresponding timing; the terminal device triggers a registration update based on the information determined by the registration management entity. Thus, the method, device and computer readable medium can introduce less modification to the network and have good compatibility.

20 Claims, 7 Drawing Sheets

(56) References Cited

U.S. PATENT DOCUMENTS

| | | | | |
|---|---|---|---|---|
| 2012/0258754 A1* | 10/2012 | Banu | .................... | H04W 16/28 |
| | | | | 455/513 |
| 2016/0014632 A1 | 1/2016 | Siow et al. | .................... | 28/266 |
| 2018/0199160 A1* | 7/2018 | Edge | .................... | H04W 4/029 |
| 2018/0279249 A1* | 9/2018 | Lv | .................... | H04W 48/10 |
| 2020/0068355 A1* | 2/2020 | Edge | .................... | H04W 4/029 |
| 2021/0410198 A1* | 12/2021 | Qiao | ................ | H04W 74/0841 |
| 2022/0060250 A1* | 2/2022 | Xu | .................... | H04B 7/18519 |

FOREIGN PATENT DOCUMENTS

| | | | | |
|---|---|---|---|---|
| CN | 1328725 A | 12/2001 | | |
| CN | 106817763 A | 6/2017 | | |
| CN | 108141277 A | 6/2018 | | |
| EP | 1 118 174 B1 | 11/2004 | | |
| EP | 3869906 A1 * | 8/2021 | ........... | H04B 7/1851 |
| WO | WO-2012115553 A1 * | 8/2012 | ........... | H04B 7/0408 |
| WO | WO-2018/156696 A1 | 8/2018 | | |

\* cited by examiner

METHOD, DEVICE AND COMPUTER READABLE MEDIUM FOR SUPPORTING SATELLITE ACCESS

CROSS REFERENCE TO RELATED APPLICATION

This patent application is a U.S. National Stage application of International Patent Application Number PCT/CN2018/108477 filed Sep. 28, 2018, which is hereby incorporated by reference in its entirety.

FIELD

Embodiments of the present disclosure generally relate to communication techniques, and more particularly, to methods, devices and computer readable medium for supporting satellite access.

BACKGROUND

In cellular communication systems, such as Long Term Evolved (LTE) communication systems or New Radio (NR) systems, each cell needs to broadcast a Tracking Area Code (TAC) which is associated with a specific tracking area. A Registration Area comprises one or more tracking areas.

When a terminal device registers with the network over a $3^{rd}$ Generation Partner Project (3GPP) access, a registration management entity, such as an Access and Mobility Management Function (AMF) allocates a Registration area to the terminal device. The terminal device performs registration update when move out of the Registration area, or when a periodic registration update timer expires, etc. The AMF know the UE's location at Registration Area level. If there is a downlink data for the terminal device and multiple cells belong to a same Registration Area, the AMF requests all related cells to Page the terminal device.

SUMMARY

Generally, embodiments of the present disclosure relate to a method for supporting satellite access and the corresponding communication devices.

In a first aspect, embodiments of the disclosure provide a device. The device comprises: at least on processor; and a memory coupled to the at least one processor, the memory storing instructions therein, the instructions, when executed by the at least one processor, causing the device to: receive a request for registration to the network. The request is initiated by a terminal device and is associated with information on the location of the terminal device. The device is further caused to obtain coverage information of a set of beams. For each of the beams, the coverage information indicates a plurality of locations that can be covered by the beam and timings when each of the plurality of locations is covered. The set of beams are from one or more satellites. The device is further caused to select, from the set of beams and based on the coverage information, one or more beams able to cover a location of the terminal device. The device is further caused to transmit, to the terminal device, a response to the request, the response comprising an identity of each of the selected beams and the associated timings.

In a second aspect, embodiments of the disclosure provide a terminal device. The terminal device comprises: at least on processor; and a memory coupled to the at least one processor, the memory storing instructions therein, the instructions, when executed by the at least one processor, causing the terminal device to initiate a request for registration to the network. The terminal device is further caused to receive a response to the request. The response comprises an identity of each of beams and associated timings. The beams are able to cover a location of the terminal device. The beams are from one or more satellites. The terminal device is further caused to update local information about the registration to the network with the response.

In a third aspect, embodiments of the present disclosure provide a method. The method comprises: receiving a request for registration to the network. The request is initiated by a terminal device and is associated with information on location of the terminal device. The method also comprises obtaining coverage information of a set of beams. For each of the beams, the coverage information indicates a plurality of locations that can be covered by the beam and timings when each of the plurality of locations is covered. The beams are from one or more satellites. The method further comprises selecting, from the set of beams and based on the coverage information, one or more beams able to cover a location of the terminal device. The method also comprises transmitting, to the terminal device, a response to the request, the response comprising an identity of each of the selected beams and the associated timings.

In a fourth aspect, embodiments of the present disclosure provide a method. The method comprises initiating a request for registration to the network. The method also comprises receiving a response to the request, the response comprising an identity of each of beams and associated timings, the beams able to cover a location of the terminal device. The method further comprises updating local information about the registration to the network with the response.

In a fifth aspect, embodiments of the disclosure provide an apparatus for communication. The apparatus comprises means for receiving a request for registration to the network. The request is initiated by a terminal device. The apparatus also comprises means for obtaining coverage information of a set of beams. For each of the beams, the coverage information indicates a plurality of locations that can be covered by the beam and timings when each of the plurality of locations is covered. The beams are from one or more satellites. The apparatus further comprises means for selecting, from the set of beams and based on the coverage information, one or more beams able to cover a location of the terminal device. The apparatus yet comprises means for transmitting, to the terminal device, a response to the request, the response comprising an identity of each of the selected beams and the associated timings, In a sixth aspect, embodiments of the disclosure provide an apparatus for communication. The apparatus comprises means for initiating a request for registration to the network. The apparatus also comprises means for receiving a response to the request, the response comprising an identity of each of beams and associated timings, the beams able to cover a location of the terminal device. The beams are from one or more satellites. The apparatus further comprises means for updating the registration to the network with the response.

In a seventh aspect, embodiments of the disclosure provide a computer readable medium. The computer readable medium stores instructions thereon, the instructions, when executed by at least one processing unit of a machine, causing the machine to implement the methods according to the third and fourth aspects.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In scenarios of non-Group on Earth Observations (GEO) and Non-Terrestrial networks, the cell (that is, a beam of a satellite) keeps moving. This means a stationary terminal device may see different cells, since different satellite beams cover the area over time. A stationary terminal device may have to keep performing Registration Updates if the beam changes. For example, in the Iridium system, a stationary terminal device changes beam every 50-seconds. It is very inefficient for a stationary terminal device to frequently perform Registration Updates, considering a battery and control plane overheads.

In conventional technologies, an option to reduce the frequent Registration Updates is to assign a Registration Area compressing several Tracking Areas. However, it may cause an issue for Paging which needs to be sent in all cells of the Registration Area, that is, all satellite beams belonging to the same tracking area. The coverage of a single satellite beam may be very large compared to cells in a Terrestrial Network. For low earth orbit (LEO), the typical beam footprint diameter size is 100 KM-500 KM. Sending the Paging via multiple beams of same or different satellites is inefficient and creates a lot of downlink overhead. The Paging message should be sent only in one or a few beams. Having beams of different satellites within one Registration Area is suffering from the additional problem that they may create a non-continuous area due to the different movements of the different satellites.

In a conventional technology, the satellite or beam does not broadcast TAC over the air. The TAC is not used by the terminal device to determine whether need to perform Registration Update. Instead, during the initial Registration procedure, the Radio access network (RAN) determines the terminal device's TAC based on its geo-location. The determined TAC is sent to the core network (CN). The CN then assigns a new type of Registration Area indicating by Tdist. If the terminal device has moved by Tdist KM away from previously reported Geo-Location, the terminal device performs Registration Update. When there is a need to send Paging, the CN (or RAN) determines the beam based on the terminal device's Geo-location.

This Registration Update trigger is quite different from current terrestrial network. For example, the beam does not broadcast Tracking Area Code, or the broadcasted Tracking Area Code is not used by the terminal device to determine whether it has moved out the Registration Area. The Satellite RAN (SRAN) determines the TAC based on the terminal device position. The technology does not use current Registration Update trigger (that is, the terminal device performs registration update when the terminal device detects it moves out of the assigned Registration Area).

However, it is difficult for the terminal device to make the Registration Update decision based on Tdist, that is, the Tdist is different when the terminal device moves in different directions. It is not possible to assign Tdist for all directions. In many cases, the Paging may need to be sent in two or more beams.

Figure 1:
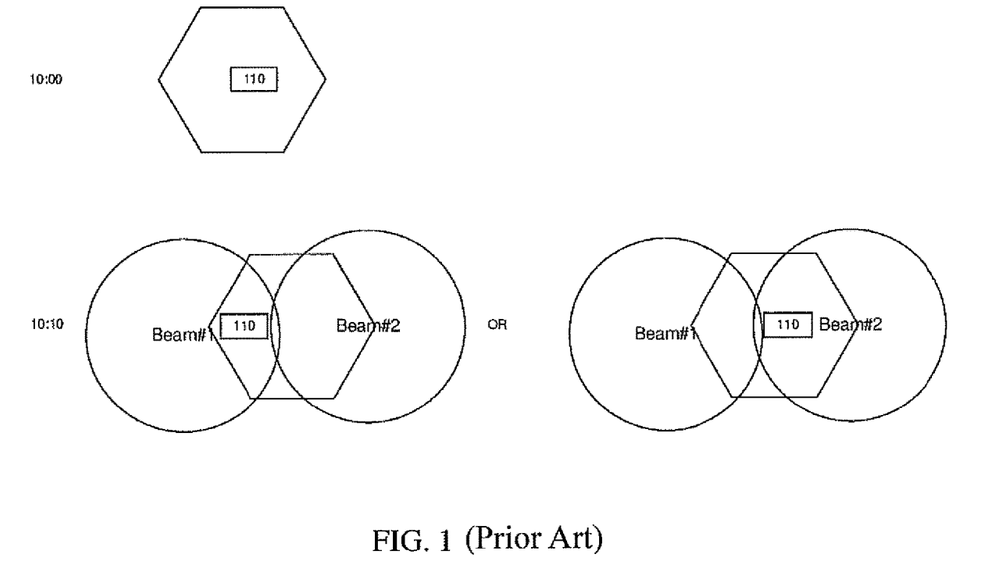
FIG. 1 illustrates a schematic diagram of scenarios of changing beams according to conventional technologies.

FIG. 1 illustrates a schematic diagram of scenarios of changing beams according conventional technologies. As shown in FIG. 1, the terminal device 110 is in a Tracking Area. The distance to the edge of the Tracking Area is 50 KM. At 10:00, during the Registration procedure, the terminal device 110 is informed about Tdist=50 KM. At 10:10, this Tracking Area is served by 2 beams, that is, Beam #1 covers the west half, and Beam #2 covers the east half as shown in FIG. 1. The terminal device 110 may be moved about 20 KM, which is less than Tdist. So the terminal device 110 does not perform Registration Update. However, the network cannot know whether the terminal device 110 has moved to west area (left figure), or east area (right figure) of current Tracking Area or has not moved at all. The Paging has to be sent via both beams.

Figure 2:
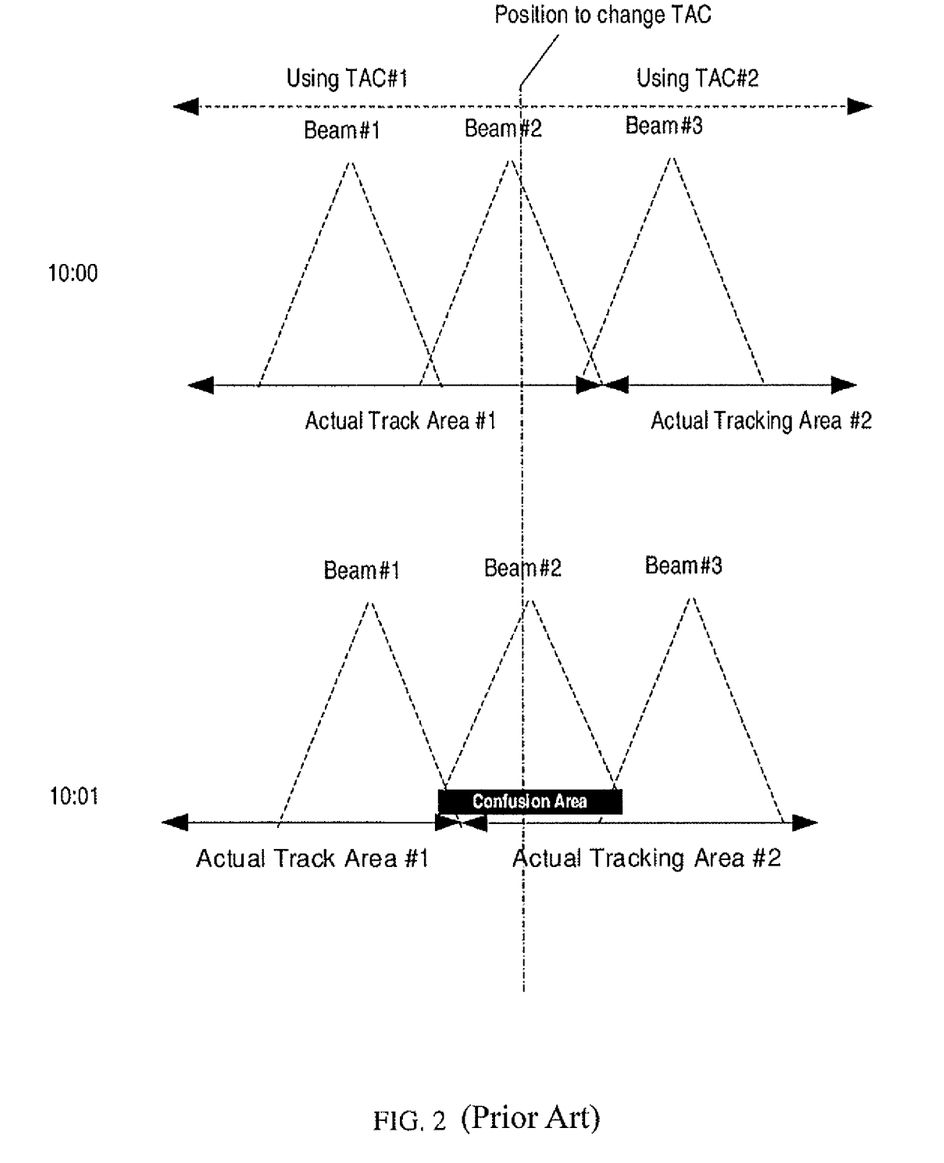
FIG. 2 illustrates a schematic diagram of scenarios of updating tracking areas according to conventional technologies.

FIG. 2 illustrates a schematic diagram of scenarios of updating tracking areas according to conventional technologies. As shown in FIG. 2, a stationary terminal device on the ground will always be covered by the same network identifiers in the same position (similarly to the terrestrial network scenario). Depending on how closely the granularity of the satellite antenna beams enables to contour the desired coverage area, there could be slight variations in coverage.

In this approach, the beam needs to change the Tracking Area Code when it reaches at a specific location. This can cause issues for the terminal devices at the boarder of the Tracking Area. As shown in FIG. 2, Beam #1 will broadcast TAC #1 at 10:00 (i.e. before it reaches the changing point). At 10:01, it reaches the changing point, it switches to broadcast TAC #2. The UEs in the highlighted "confusion area" will first see TAC #1, then suddenly change to TAC #2.

This may have 2 issues: (1) the Registration Area for the terminal devices in the "confusion area" need to include both TAC #1 and TAC #2. This can cause Paging efficiency issue since the Paging for these the terminal devices need to be sent in both tracking areas; (2) the actual coverage of the Tracking Area dynamically changes. For example, if the beam footprint Diameter=200 KM, the actual coverage for Tracking Area #1 and #2 can vary from 200 KM-100 KM to 200 KM+100 KM.

According to embodiments of the present disclosure, the registration management entity of the network determines information regarding which beams cover the location of the terminal device and the corresponding timing. According to embodiments of the present disclosure, the terminal device triggers a registration update based on the information determined by the registration management entity. Thus, embodiments of the present disclosure introduce less modification to the network and have good compatibility.

Now some example embodiments of the present disclosure are described below with reference to the figures. However, those skilled in the art would readily appreciate that the detailed description given herein with respect to these figures is for explanatory purpose as the present disclosure extends beyond theses limited embodiments.

Figure 3:
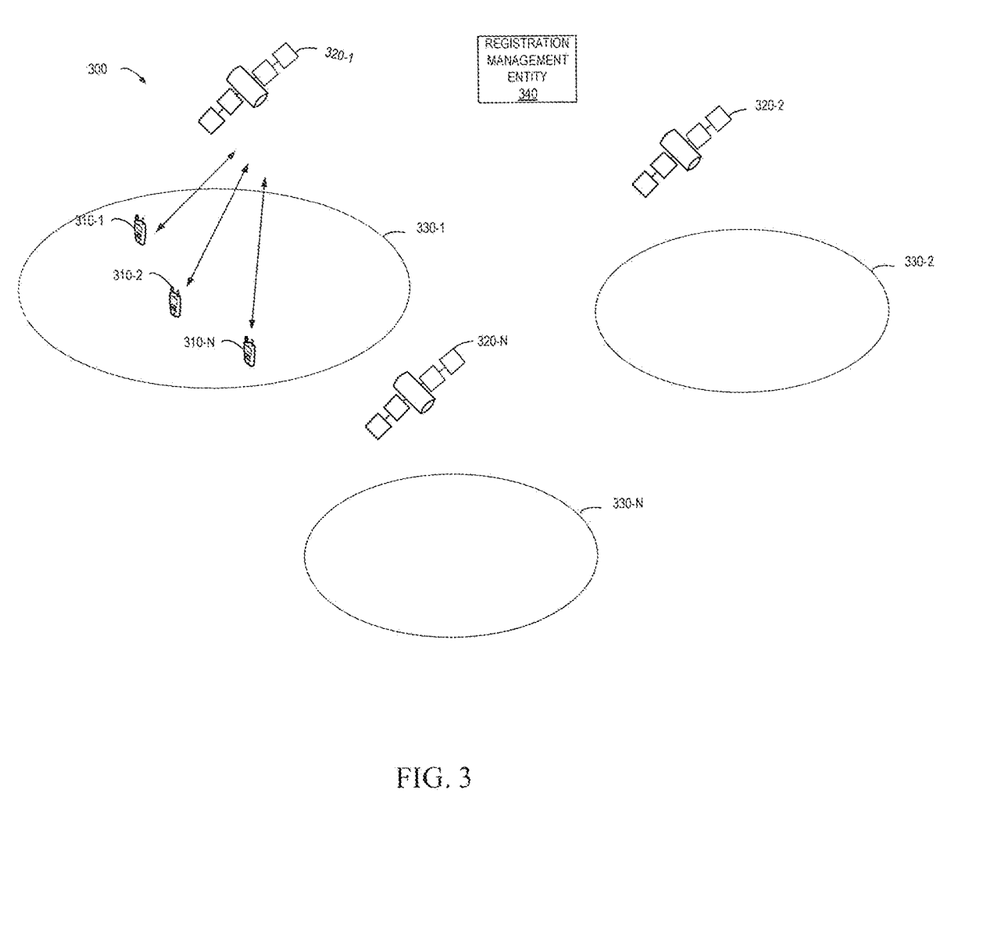
FIG. 3 illustrates a schematic diagram of a communication system according to embodiments of the present disclosure.

FIG. 3 illustrates a schematic diagram of a communication system 300 in which embodiments of the present disclosure can be implemented. The communication system 300, which is a part of a communication network, comprises terminal devices 310-1, 310-2, . . . , 310-N (collectively referred to as "terminal device(s) 310" where N is an integer number), satellites 320-1, 320-2, . . . , 320-N (collectively referred to as "satellite(s) 320" where N is an integer number) and a registration management entity 340. It should be noted that the communication system 300 may also comprise other elements which are omitted for the purpose of clarity. The satellites 320 may communicate with the terminal devices 310. It is to be understood that the numbers of satellites, terminal devices and management entities shown in FIG. 3 are given for the purpose of illustration without suggesting any limitations. The communication system 300 may include any suitable number of network devices, terminal devices and management entities. As shown in FIG. 3, each of the satellites has a tracking area, for example, the tracking areas 330-1, 330-2, . . . , 330-N (collectively referred to as "tracking area(s) 330"). Each satellite may have one or more beams. In some embodiments, some terrestrial part of a satellite radio access network (SRAN) may be leveraged.

Communications in the communication system 400 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 4:
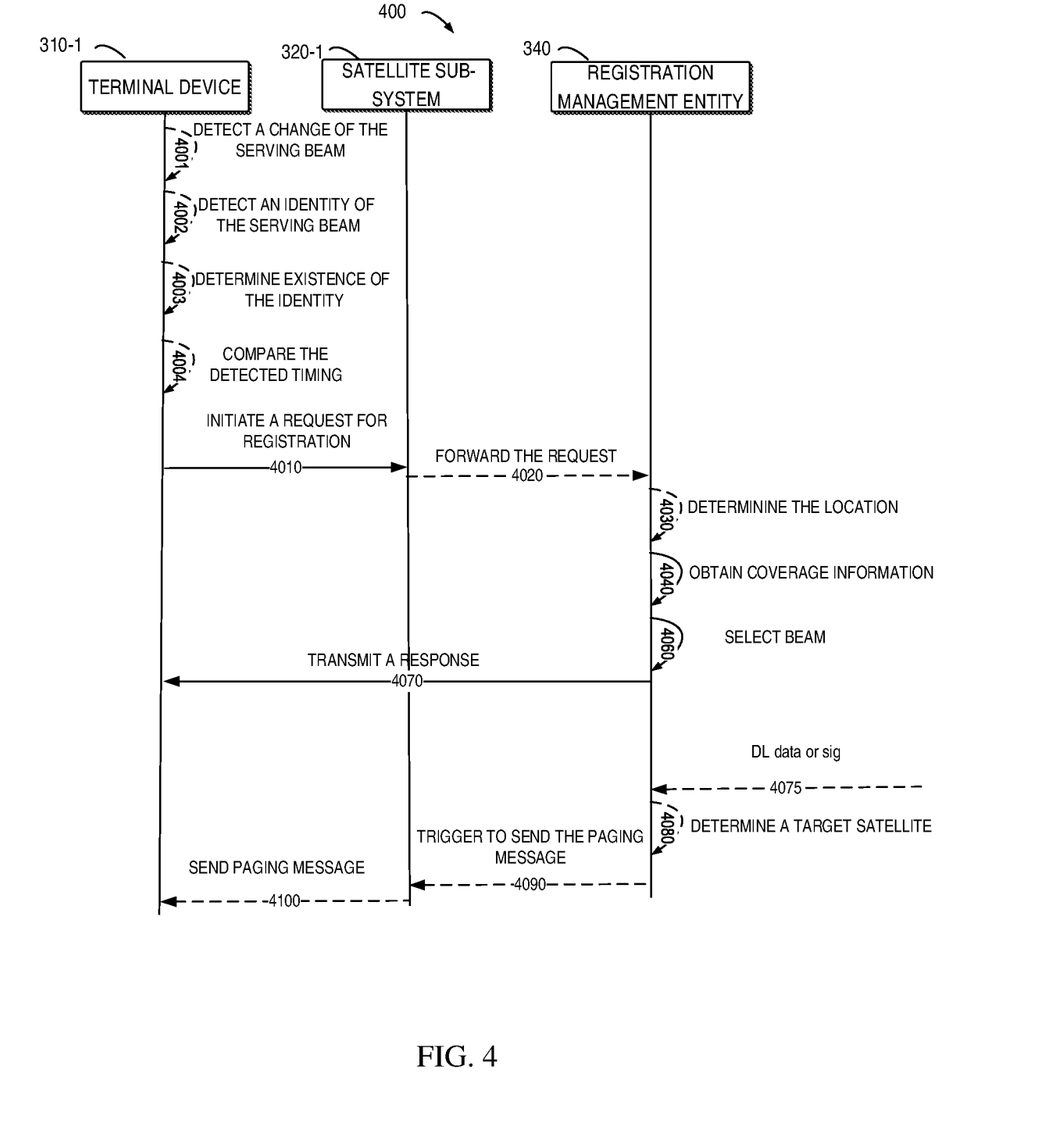
FIG. 4 illustrates a schematic diagram of interaction operations among communication networks according to embodiments of the present disclosure.

FIG. 4 illustrates an interaction operation 400 among terminal devices, the satellite sub-system which may include multiple satellites and registration management entities. Only for the purpose of illustrations, the interaction operation 400 shown in FIG. 4 is implemented at the terminal device 310-1, the satellite sub-system 320-1 and the registration management entity 340. The first beam and the second beam described below may belong to same satellite, or different satellites. In some embodiments, the satellite sub-system 320-1 may comprise a distributed unit (DU) and a centralize unit (CU). In other embodiments, the CU may be separated from the satellite sub-system 320-1. Only for clarity purpose, the CU and DU is not shown in FIG. 4, and it is assumed the satellite has both CU and DU function unless explicit described below. It should be noted that embodiments of the present disclosure can be implemented in the CU-DU distributed architecture or the CU-DU integrated architecture.

The terminal device 310-1 initiates 4010 a request for registration to the network 400. The request may be a Non-Access Stratum (NAS) message. If it is the first time that the terminal device 310-1 registers to the network, the terminal device 310-1 initiates the request directly. The terminal device 310-1 may include its geo-location information in the registration request, or in a separate message to the satellite sub-system 320-1.

In other embodiments, initiating the request may be triggered under certain conditions. The terminal device 310-1 previously initiated a request and obtained the previous response to the previous request. The interaction operation 400 described in FIG. 4 may also be applied in relation to a response received from a previous registration request. In such situation, if the terminal device 310-1 detects 4001 that the serving beam for the terminal device 310-1 is changed, the terminal device 310-1 may detect 4002 the identity of the serving beam. For example, if the serving beam is changed from a first beam to a second beam at 10:32 AM, the terminal device 310-1 may determine 4003 whether the identity of the second beam exists in the previous response to a registration request. If the identity of the second beam does not exist in the previous response, the terminal device 310-1 initiates 4010 the request for registration to the network, in order to update the registration. In some embodiments, the terminal device 310-1 may detect 4002 the identity of the serving beam regardless whether the serving beam being changed or not.

In a further example, if the identity of the beam does not change or the identity of the changed beam exists in the response, the terminal device 310-1 may compare 4004 the detected timing (for example, 10:32 AM) with the associated timing included in the previous response. If the detected timing matches with the associated timing, the terminal device 310-1 does not perform the registration update. For example, the previous response indicates that the second beam covers the location from 09:31 AM-10:00 AM and the detected timing is 09:32 AM, the terminal device 310-1 does not update the registration in this situation. If the detected timing does not match with the associated timing, the terminal device 310-1 imitates 4010 the request for registration. For example, if the detected timing is 09:25 which does not match with the associated timing 09:31 AM-10:00 AM, the terminal device 310-1 initiates the registration update.

In this way, the terminal device does not need to update the registration every time the serving satellite beam is changed. Thus, efficiency of the battery of the terminal device is increased and the overheads of the control plane are reduced.

In an example embodiment, the terminal device may provide together with the registration update any own location information it has determined or measurement related with satellite reception. The satellite subsystem 320-1 may forward 4020 the request to the registration management entity 340 but the satellite subsystem 320-1 may also determine the geo-location of the terminal device 310-1, and then provide it to the registration management entity 340 when the satellite subsystem 320-1 forwards 4020 the request to the registration management entity 340. The satellite subsystem 320-1 may transmit coverage information of a set of beams. The coverage information indicates for each beam, a plurality of locations that can be covered and timings when each of the plurality locations is covered. The coverage information for each beam may also indicate a plurality of areas that can be covered by the beam and the timing when the area will be covered.

In some embodiments, the coverage information for each beam may include the starting coverage area, the speed of the movement of the beam, and other information, which can help the network entity 340 to determine the start/end timing when a specific geo-location can be covered, and how long the specific geo-location can be covered by the beam. In some embodiments, by knowing the geo-location of the terminal device 310-1 either received from the terminal device 310-1, or determined in the satellite subsystem 320-1, the satellite subsystem 320-1 may provide accurate coverage information to the registration management entity 340. For example, the coverage information may be precise with a $KM^2$ level. In some embodiments, when the satellite subsystem 320-1 transfers the request to the registration management entity 340, the satellite subsystem 320-1 may also transfer some information indicating the coverage information. For example, the satellite subsystem 320-1 may transfer the request to the registration management entity 340 via a NG Application Protocol (NGAP) message, for example, the Initial UE message procedure, and the satellite subsystem 320-1 may add the identity and remaining timing information of the serving beam, identities of future beams and timing information.

The identity can be the TAC and/or cell identity of each satellite beam, or the node identity of the satellite, or any other identities that can identify the satellite and/or beam. In case the satellite sub-system 320-1 only have a Distributed Unit (DU), and the Central Unit (CU) is on the ground, the satellite part of the satellite subsystem 320-1 need to first transfer the request to the Central Unit (CU) via a F1 Application Protocol (F1AP) procedure, for example, the Initial UL Radio Resource Control (RRC) Message Transfer procedure, and the terrestrial part of the satellite subsystem 320-1 may add the identity and remaining timing information of the serving beam, identities of future beams and timing information.

In some embodiments, the satellite subsystem 320-1 may provide the coverage information to the registration management entity 340 in advance. For example, the satellite sub-system 320-1 may provide the coverage information to the registration management entity 340 via the NG Application Protocol (NGAP) procedure. If the satellite sub-system 320-1 only has a Distributed Unit (CU) and the Central Unit (CU) is on the ground, the satellite sub-system 320-1 first provides the coverage information to the CU via the F1 Application Protocol (NGAP) procedure, then CU provide the coverage information to the registration management entity 340 via the NG Application Protocol (NGAP) procedure. The NGAP procedure could be the NG Setup procedure, or the RAN Configuration Update procedure, or other NGAP procedure. The F1AP procedure could be the F1 Setup procedure, or the DU Configuration Update procedure, or other F1AP procedure.

The registration management entity 340 may determine 4030 the location of the terminal device 310-1. The determination may be based on the geo-location information received from the terminal device 310-1, or from the satellite subsystem 320-1, or from other network entity, for example, a location server. The location of the terminal device 310-1 may be the GEO-location of the terminal device 310-1. The terminal device 310-1 may include its location information together with the NAS REGISTRATION REQUEST message. The location information of the terminal device 310-1 may also be transmitted with other NAS messages.

The registration management entity 340 obtains 4040 the coverage information. In some embodiments, the registration management entity 340 may obtain the coverage information by transmitting a query to a database which stores ephemeris information of satellites. The database may be a local storage device or a remote storage that can be accessed by the registration management entity 340. As mentioned above, the satellite subsystem 320-1 may transmit the coverage information.

The registration management entity 340 selects 4060 one or more beams from the set of satellites based on the coverage information. In the situation where one satellite has only one beam, the registration management entity may select one or more satellites. In the situation where one satellite has multiple beams, the one or more beams may be selected from one satellite or different satellites. The one or more beams that are selected are able or will be able to cover the location of the terminal device 210-1. The registration management entity transmits 4070 a response to the terminal device 310-1. The response comprises a list of identity of each of the selected beams and the associated timings. The identity can be the TAC and/or cell identity of each satellite beam, or the node identity of the satellite, or any other identities that can identify the satellite and/or beam. In this way, the movement of the cells is also taken into consideration, which avoids that the terminal device request registration update frequently.

For example, the response may comprise Table 1 shown below. It should be noted that the values shown in Table 1 are for the purpose of illustrations or limitations. The actual identity information sent to the terminal device may be any kind of a beam identity, for example, a Tracking Area Code (TAC), a cell ID, a beam ID, an area ID and the like.

TABLE 1

| IDENTITY | TIMING |
|---|---|
| BEAM #1 | 10:00AM-10:30AM |
| BEAM #2 | 10:31AM-11:00AM |

In some embodiments, if downlink data or signaling 4075 needs to be transmitted to the terminal device 310-1, the registration management entity 340 may determine 4080 the target beam which is covering the location of the terminal device 310-1. For example, if the downlink data needs to be transmitted at 10:15 AM, the registration management entity 340 may determine that the target beam which is covering the location of the terminal device 310-1 is the BEAM #1. The registration management entity 340 may also determine the corresponding satellite. For example, if the BEAM #1 is from a satellite within the satellite subsystem 320-1, the registration management entity 340 determines the satellite sub-system 320-1 to be the target satellite. The registration management entity 340 may trigger 4090 the satellite sub-system 320-1 to page the terminal device 310-1. For example, in the scenario of CU-DU distributed architecture, the registration management entity 340 may transmit a paging message with the identity of a satellite within the satellite subsystem 320-1 and the identity of the beam to the CU to trigger the satellite subsystem 320-1 to send 4100 the paging message to the terminal device 310-1; as an embodiment the identity of a satellite within the satellite subsystem 320-1 and the identity of the beam may be provided under the form of a cell Identifier. If the satellite subsystem 320-1 supports multiple beams, the satellite subsystem 320-1 determines the target beam (and the target satellite) based on the identity of the beam received in the paging message. In an example embodiment, the paging message may also include timing information. For example, if the paging message is transmitted at 10:30:59 AM, the terminal device 310-1 needs to be paged with the beam of a first satellite of the satellite subsystem 320-1. If the terminal device 310-1 needs to be re-paged, which may happen at 10:31:00 AM, the beam of another satellite of the satellite subsystem 320-2 may also be used to page the terminal device 310-1.

In this way, only the beam or satellite which covers the location of the terminal device 310-1 performs the paging procedure. Thus, signaling for paging is reduced.

Figure 5:
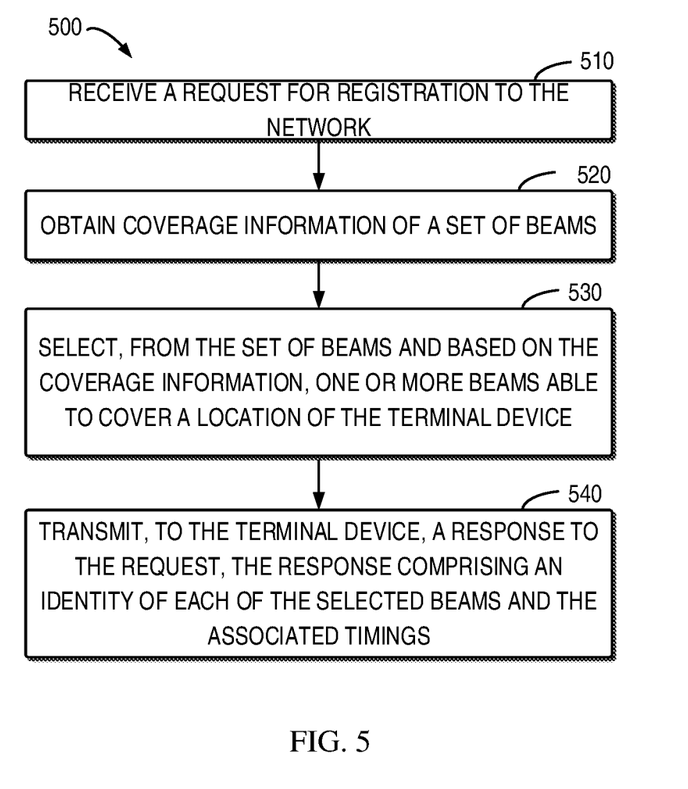
FIG. 5 illustrates a flow chart of a method implemented at a communication device according to embodiments of the present disclosure.

FIG. 5 illustrates a flow chart of a method 500 in accordance with embodiments of the present disclosure. The method 500 may be implemented at the registration management entity 340.

At block 510, the registration management entity 340 receives a request for registration to the network. The request is initiated by the terminal device 310-1. The request may correspond to an initial registration or to a re-registration. In some embodiments, the registration management entity 340 may determine the location of the terminal device from the request, or from other message received from the UE, or from the satellite subsystem 320-1, or based on the previously saved location information of terminal device 310-1 determined in other access technology. The request may be a Non-Access Strum (NAS) message possibly augmented in some embodiment by location information. In some other embodiments, the registration management entity 340 may initiate a location query procedure to the UE, or to the satellite subsystem, or to a location sever to determine the UE's location.

In an example embodiment, the registration management entity 340 may receive the request from a satellite subsystem 320-1 in the satellite subsystem. The satellite subsystem 320-1 is serving the terminal device.

At block 520, the registration management entity 340 obtains coverage information of a set of beams. For each of the beam, the coverage information indicates a plurality of locations that can be covered by the beam and timings when each of the plurality of locations is covered.

The coverage information may be transmitted to the registration management entity 340 by the satellite subsystem 320-1. In another embodiment, the registration management entity 340 receives the coverage information from the satellite subsystem 320-1 in advance.

At block 530, the registration management entity 340 selects, from the set of beams and based on the coverage information, one or more beams able to cover a location of the terminal device.

At block 540, the registration management entity 340 transmits, to the terminal device 310-1, a response to the request. The response comprises an identity of each of the selected beams and the associated timings.

In some embodiments, the registration management entity 340 may determine a target beam covering the location of the terminal device based on the coverage information, if downlink data or signaling is to be transmitted to the terminal device 310-1. The registration management entity 340 may determine a target satellite which corresponds to the target beam. The registration management entity 340 may trigger the target satellite and target beam(s) to transmit a paging message to the terminal device 310-1.

In some embodiments, an apparatus for performing the method 500 (for example, the registration management entity 340) may comprise respective means for performing the corresponding steps in the method 500. These means may be implemented in any suitable manners. For example, it can be implemented by circuitry or software modules.

In some embodiments, the apparatus comprises: means for receiving a request for registration to the network, the request initiated by a terminal device; means for obtaining coverage information of a set of beams, wherein for each of the beam, the coverage information indicates a plurality of locations that can be covered by the beam and timings when each of the plurality of locations is covered; means for selecting, from the set of beams and based on the coverage information, one or more beams able to cover a location of the terminal device, the set of beams from one or more satellites; and means for transmitting, to the terminal device, a response to the request, the response comprising an identity of each of the selected beams and the associated timings.

In some embodiment, the request is a Non-Access Strum (NAS) message.

In some embodiments, the response is a Non-Access Strum (NAS) message.

In some embodiments, the means for obtaining the coverage information comprises means for obtaining the coverage information from a satellite subsystem or a database.

In some embodiments, the means for obtaining the coverage information comprises means for obtaining the coverage information from a satellite in advance.

In some embodiments, the coverage information is from the satellite subsystem via a NG Application Protocol procedure and/or F1 Application Protocol procedure.

In some embodiments, the apparatus further comprises means for in response to downlink data or signaling to be transmitted to the terminal device, determining a target beam covering the location of the terminal device based on the coverage information; means for determining a target satellite which corresponds to the target beam; and means for triggering the target satellite to transmit a paging message to the terminal device.

Figure 6:
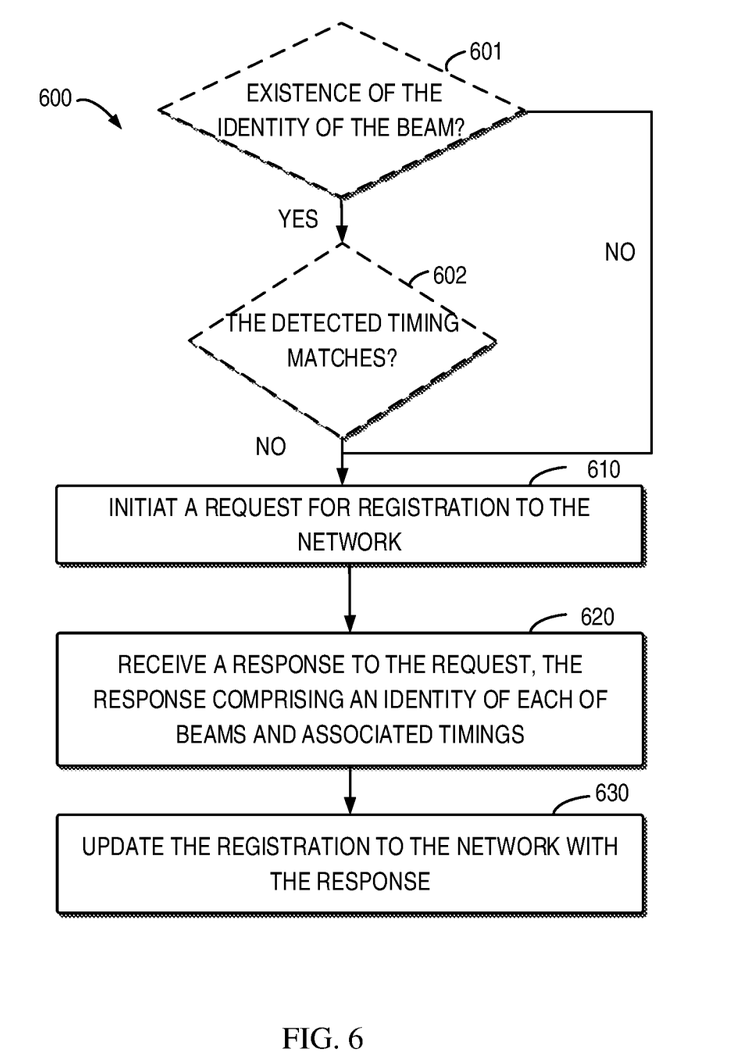
FIG. 6 illustrates a flow chart of a method implemented at a communication device according to embodiments of the present disclosure.

FIG. 6 illustrates a flow chart of a method 600 in accordance with embodiments of the present disclosure. Only for the purpose of illustrations, the method 600 is described to be implemented at the terminal device 310-1. It should be noted that the method 600 can be implemented at any suitable terminal devices.

At block 610, the terminal device 310-1 initiates a request for registration to the network. The request may comprise an indication of the location. In some embodiments, the terminal device 310-1 may send the request as a Non-Access Strum (NAS) message. If it is the first time that the terminal device 310-1 registers to the network, the terminal device 310-1 initiates the request directly.

In other embodiments, initiating the request may be triggered under certain conditions. The terminal device 310-11 previously initiated a request and obtained the previous response to the previous request. In such situation, if the serving beam for the terminal device 310-1 is changed, the terminal device 310-1 may detect the identity of the changed serving beam. At block 601, the terminal device 310-1 may determine whether the identity of the changed beam exists in the previous response. If the identity of the changed beam does not exist in the previous response, the terminal device 310-1 initiates the request for registration to the network at block 610.

In a further example, if the identity of the beam does not change or the identity of the changed beam exists in the response, the terminal device 310-1 may compare the detected timing (for example, 10:32 AM) with the associated timing included in the previous response at block 602. If the detected timing matches with the associated timing, the terminal device 310-1 does not update the registration. If the detected timing does not match with the associated timing, the terminal device 310-1 imitates the request for registration at 610. In other embodiments, the terminal device 310-1 may initiate the request periodically.

At block 620, the terminal device 310-1 receives a response to the request. The response comprises an identity of each of beams and associated timings. The beams are able to cover a location of the terminal device. The beams are from one or more satellites.

At block 630, the terminal device 310-1 updates local information associated with the registration to the network with the response.

In some embodiments, the terminal device 310-1 may detect an identity of the second beam, if a serving beam for the terminal device is changed from a first beam to a second beam. The terminal device 310-1 may determine whether the identity of the second beam is included in the response. The terminal device 310-1 may update location information associated with the registration to the network, if a determination that the identity of the second beam is missed in the response. In some embodiments, the terminal device 310-1 may detect the identity of current serving beam even if the serving beam is not changed.

In other embodiments, the terminal device 310-1 may compare the detected time with an associated timing of the second beam comprised in the response, if the identity of the second beam is comprised in the response. The terminal device 310-1 may update the local information associated with registration to the network if a determination is that the associated timing of the second beam mismatches the detected time.

In some embodiments, an apparatus for performing the method 600 (for example, the terminal device 310-1) may comprise respective means for performing the corresponding steps in the method 600. These means may be implemented in any suitable manners. For example, it can be implemented by circuitry or software modules.

In some embodiment, the apparatus comprise means for initiating a request for registration to the network; means for receiving a response to the request, the response comprising an identity of each of beams and associated timings, the beams able to cover a location of the terminal device, the beams being from one or more satellites; and means for updating the registration to the network with the response. In some embodiments, the request comprises an indication of the location.

In some embodiment, the means for initiating the request comprises means for sending the request as a Non-Access Strum (NAS) message. In some embodiments, the response is a Non-Access Strum (NAS) message.

In some embodiment, the means for initiating the request for registration: means for detecting a change of a serving beam for the terminal device; means for in response to a detection that the serving beam for the terminal device changes from a first beam to a second beam, detecting an identity of the second satellite; means for determining whether the identity of the second beam is included in a previous response to a previous request for registration; and means for in response to a determination that the identity of the second beam is missed in the previous response, initiating the request for registration to the network.

Figure 7:
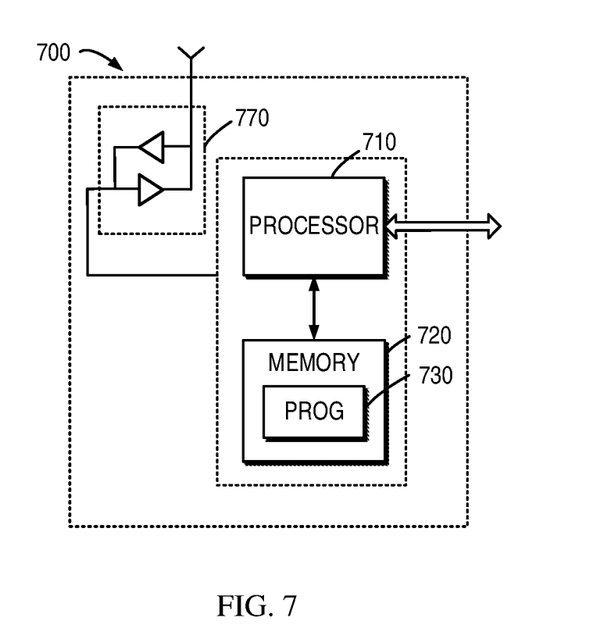
FIG. 7 illustrates a schematic diagram of a device according to embodiments of the present disclosure.

In some embodiment, the apparatus further comprises: means for detecting an identity of a serving beam for the terminal device; means for determining whether the identity of the serving beam is included in a previous response to a previous request for registration; means for in response to the identity of the serving beam being comprised in the response, comparing the detected time with an associated timing of the second beam comprised in the previous response; and means for in response to a determination that the associated timing of the serving beam mismatches the detected time, initiating the request for registration to the network, FIG. 7 is a simplified block diagram of a device 700 that is suitable for implementing embodiments of the present disclosure. The device 700 may be implemented at the registration management entity 730. The device 700 may also be implemented at the terminal device 310-1. As shown, the device 700 includes one or more processors 710, one or more memories 720 coupled to the processor(s) 710, one or more transmitters and/or receivers (TX/RX) 710 coupled to the processor 710.

The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 720 stores at least a part of a program 730. The TX/RX 710 is for bidirectional communications. The TX/RX 740 has at least one antenna to facilitate communication, though in practice an Access Node mentioned in this application may have several ones. The communication interface may represent any interface that is necessary for communication with other network elements.

The program 730 is assumed to include program instructions that, when executed by the associated processor 710, enable the device 700 to operate in accordance with the embodiments of the present disclosure, as discussed herein with reference to FIGS. 4 and 6. That is, embodiments of the present disclosure can be implemented by computer software executable by the processor 710 of the device 700, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A terminal device, comprising:
at least one processor; and a non-transitory memory coupled to the at least one processor, the memory storing instructions therein, the instructions, when executed by the at least one processor, causing the terminal device to:
initiate, with the terminal device, a request for registration to a network, wherein the terminal device is caused to initiate the request for registration to the network by:
  detecting a change of a serving beam for the terminal device;
  in response to a detection that the serving beam for the terminal device changes from a first beam to a second beam, detecting an identity of the second beam;
  determining whether the identity of the second beam is included in a previous response to a previous request for registration; and
  in response to a determination that the identity of the second beam is missed in the previous response, initiating the request for registration to the network;
receive a response to the request, the response comprising an identity of beams and associated timings indicating when the beams cover a location of the terminal device, the beams able to cover the location of the terminal device during at least one time period indicated with the associated timings, the beams being from one or more satellites; and
update local information associated with the registration to the network with the response.

2. The terminal device of claim 1, wherein the device is caused to initiate the request by sending the request as a non-access stratum message.

3. The terminal device of claim 1, wherein the response is a non-access stratum message.

4. The device of claim 1, wherein the terminal device is a user equipment.

5. The terminal device of claim 1, wherein the device is further caused to:
detect an identity of the serving beam for the terminal device;
determine whether the identity of the serving beam is included in a previous response to a previous request for registration;
in response to the identity of the serving beam being included in the response, compare a detected time with an associated timing of the second beam included in the previous response; and
in response to a determination that the associated timing of the serving beam mismatches the detected time, initiating the request for registration to the network.

6. A method comprising:
initiating, with a terminal device, a request for registration to a network, wherein initiating a request for registration to the network comprises:
  detecting a change of a serving beam for the terminal device;
  in response to a detection that the serving beam for the terminal device changes from a first beam to a second beam, detecting an identity of the second beam;
  determining whether the identity of the second beam is included in a previous response to a previous request for registration; and
  in response to a determination that the identity of the second beam is missed in the previous response, initiating the request for registration to the network;
receiving a response to the request, the response comprising an identity of each of beams and associated timings indicating when the beams cover a location of the terminal device, the beams able to cover the location of the terminal device during at least one time period indicated with the associated timings, the beams being from one or more satellites; and
updating a local context associated with the registration to the network with the response.

7. The method of claim 6, wherein initiating the request comprises sending the request as a non-access stratum message.

8. The method of claim 6, wherein the response is a non-access stratum message.

9. The method of claim 6, wherein the terminal device is a user equipment.

10. The method of claim 6, further comprising:
detecting an identity of the serving beam for the terminal device;
determining whether the identity of the serving beam is included in a previous response to a previous request for registration;
in response to the identity of the serving beam being included in the previous response, comparing a detected time with an associated timing of the second beam included in the previous response; and
in response to a determination that the associated timing of the serving beam mismatches the detected time, initiating the request for registration to the network.

11. A terminal device, comprising:
at least one processor; and
a non-transitory memory coupled to the at least one processor, the memory storing instructions therein, the instructions, when executed by the at least one processor, causing the terminal device to:
  detect an identity of a serving beam for the terminal device;
  determine whether the identity of the serving beam is included in a previous response to a previous request for registration;
  in response to the identity of the serving beam being included in the previous response, compare a detected time with an associated timing of a second beam included in the previous response; and
  in response to a determination that the associated timing of the serving beam mismatches the detected time, initiate a request for registration to a network;
  receive a response to the request, the response comprising an identity of beams and associated timings indicating when the beams cover a location of the terminal device, the beams able to cover the location of the terminal device during at least one time period indicated with the associated timings, the beams being from one or more satellites; and
  update local information associated with the registration to the network with the response.

12. The terminal device of claim 11, wherein the device is caused to initiate the request by sending the request as a non-access stratum message.

13. The terminal device of claim 11, wherein the response is a non-access stratum message.

14. The terminal device of claim 11, wherein the device is caused to initiate the request for registration to the network by:
detecting a change of the serving beam for the terminal device;
in response to a detection that the serving beam for the terminal device changes from a first beam to the second beam, detecting an identity of the second beam;

determining whether the identity of the second beam is included in a previous response to a previous request for registration; and in response to a determination that the identity of the second beam is missed in the previous response, initiating the request for registration to the network.

15. The terminal device of claim 11, wherein the terminal device is a user equipment.

16. A method comprising:

detecting an identity of a serving beam for a terminal device;

determining whether the identity of the serving beam is included in a previous response to a previous request for registration;

in response to the identity of the serving beam being included in the previous response, comparing a detected time with an associated timing of a second beam included in the previous response; and in response to a determination that the associated timing of the serving beam mismatches the detected time, initiating the request for registration to a network;

initiating, with a terminal device, a request for registration to a network;

receiving a response to the request, the response comprising an identity of each of beams and associated timings indicating when the beams cover a location of the terminal device, the beams able to cover the location of the terminal device during at least one time period indicated with the associated timings, the beams being from one or more satellites; and updating a local context associated with the registration to the network with the response.

17. The method of claim 16, wherein initiating the request comprises sending the request as a non-access stratum message.

18. The method of claim 16, wherein the response is a non-access stratum message.

19. The method of claim 16, wherein initiating a request for registration to the network comprises:

detecting a change of the serving beam for the terminal device;

in response to a detection that the serving beam for the terminal device changes from a first beam to a second beam, detecting an identity of the second beam;

determining whether the identity of the second beam is included in a previous response to a previous request for registration; and in response to a determination that the identity of the second beam is missed in the previous response, initiating the request for registration to the network.

20. The method of claim 16 wherein the terminal device is a user equipment.

* * * * *